United States Patent
Stein et al.

(10) Patent No.: US 9,583,260 B2
(45) Date of Patent: Feb. 28, 2017

(54) SYSTEM AND METHOD FOR INCREASING COUPLING OF AN AXLE ROTARY TRANSFORMER

(71) Applicant: Goodrich Corporation, Charlotte, NC (US)

(72) Inventors: Eric Stein, Phoenix, AZ (US); Perry Leaves, Springboro, OH (US)

(73) Assignee: GOODRICH CORPORATION, Charlotte, NC (US)

(*) Notice: Subject to any disclaimer, the term of this patent is extended or adjusted under 35 U.S.C. 154(b) by 41 days.

(21) Appl. No.: 14/339,185

(22) Filed: Jul. 23, 2014

(65) Prior Publication Data
US 2016/0027576 A1 Jan. 28, 2016

(51) Int. Cl.
| | | |
|---|---|---|
| H04B 5/00 | (2006.01) |
| F04D 27/02 | (2006.01) |
| H01F 38/18 | (2006.01) |
| F01D 17/10 | (2006.01) |
| F02C 6/08 | (2006.01) |
| H02J 5/00 | (2016.01) |

(52) U.S. Cl.
CPC ........... *H01F 38/18* (2013.01); *F01D 17/105* (2013.01); *F02C 6/08* (2013.01); *F04D 27/023* (2013.01); *F04D 27/0215* (2013.01); *H02J 5/005* (2013.01); *H04B 5/0037* (2013.01); *H04B 5/0093* (2013.01); *F05D 2260/963* (2013.01)

(58) Field of Classification Search
CPC ........ H01F 38/18; H02J 5/005; H04B 5/0037; H04B 5/0093; G08C 17/00; G08C 17/04
See application file for complete search history.

(56) References Cited

U.S. PATENT DOCUMENTS 4,075,603 A * 2/1978 Snyder .................. B60C 23/041
200/61.25
4,631,959 A * 12/1986 Motycka .................. G01P 5/02
73/170.15
(Continued)

FOREIGN PATENT DOCUMENTS

EP 2136053 12/2009

OTHER PUBLICATIONS

Underhill, Solenoids Electromagnets and Electricmagnetic Windings, 223 Illustrations, 1910, New York, pp. 1-388, D. Van Nostrand Company.
(Continued)

*Primary Examiner* — Sujatha Sharma
(74) *Attorney, Agent, or Firm* — Snell & Wilmer, L.L.P.

(57) ABSTRACT

Described herein is a system and method to enable a wireless power transmission link system. The wireless power transmission link system may comprise an axle and an optional telemetry unit interior to the axle. The wireless power transmission link system may comprise a first cup located interior to the telemetry unit and/or the axle. The first cup may comprise a first channel for housing a first wound coil. The wireless power transmission link system may comprise a second cup separated by an air gap from the first cup. The second cup may comprise a second channel for housing a second wound coil. The first wound coil and the second wound coil may form a portion of an inductively coupled, resonant, air-core transformer. The first cup and/or the second cup may comprise ferromagnetic material properties.

12 Claims, 3 Drawing Sheets

(56) References Cited

U.S. PATENT DOCUMENTS

| | | | |
|---|---|---|---|
| 4,945,269 A * | 7/1990 | Kamm | H02K 33/00 |
| | | | 310/12.21 |
| 4,979,587 A | 12/1990 | Hirt et al. | |
| 6,072,265 A * | 6/2000 | Grehant | H02N 2/147 |
| | | | 310/316.02 |
| 2008/0179132 A1 | 7/2008 | Hunt et al. | |
| 2009/0192667 A1* | 7/2009 | Burreson | B60C 23/003 |
| | | | 701/29.1 |
| 2013/0192860 A1* | 8/2013 | Puzio | B25F 5/00 |
| | | | 173/47 |
| 2013/0340441 A1 | 12/2013 | Little et al. | |

OTHER PUBLICATIONS

Extended European Search Report dated Dec. 18, 2015 in European Application No. 15177629.1.

* cited by examiner

SYSTEM AND METHOD FOR INCREASING COUPLING OF AN AXLE ROTARY TRANSFORMER

FIELD OF INVENTION

The present disclosure relates to wireless energy transmission and more specifically to increase the transmission efficiency of a wireless transmission link system.

BACKGROUND

Wireless power or wireless energy transmission is the transmission of electrical energy from a power source to an electrical load without a physical connection. Wireless transmission is useful in cases where interconnecting wires are inconvenient or difficult, such as between two rotating bodies and/or between a stator and a rotor.

SUMMARY

Described herein is a system and method to enable a wireless power transmission link system according to various embodiments. The wireless power transmission link system may comprise a rotatable wheel, sensor and hub cap coupled to a stationary axle and an optional telemetry unit interior to the axle. The wireless power transmission link system may comprise a first cup located interior to the telemetry unit and/or the axle. The first cup may comprise a first channel for housing a first wound coil. As used herein the term "wound coil" may refer to a primary coil and secondary coil, such as a primary coil and secondary coil made of copper magnet wire wound in a single layer or multiple layers. The magnet wire may be insulated by a thin coating of high temperature insulation, such as polyimide. The wireless power transmission link system may comprise a second cup located interior to the telemetry unit and/or axle separated by an air gap from the first cup. According to various embodiments, the telemetry unit may be housed on the first cup; the second cup may be external to the telemetry unit, such as housed within a hub cap. A hub cap may secure a portion of a wound coil. The second cup may comprise a second channel for housing a second wound coil. The first wound coil and the second wound coil may be inductively coupled. The first cup and/or the second cup may comprise ferromagnetic material properties. The first wound coil and the second wound coil may form a portion of an inductively coupled, resonant, air-core transformer According to various embodiments, a first cup comprising an inner cylindrical solid post and an outer ring oriented concentrically around inner cylindrical solid post separated via a channel is disclosed. The channel may be configured to receive a wound coil around the cylindrical solid post. The cup may comprise ferromagnetic material properties. The cup is configured for positioning interior to a stationary axle.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
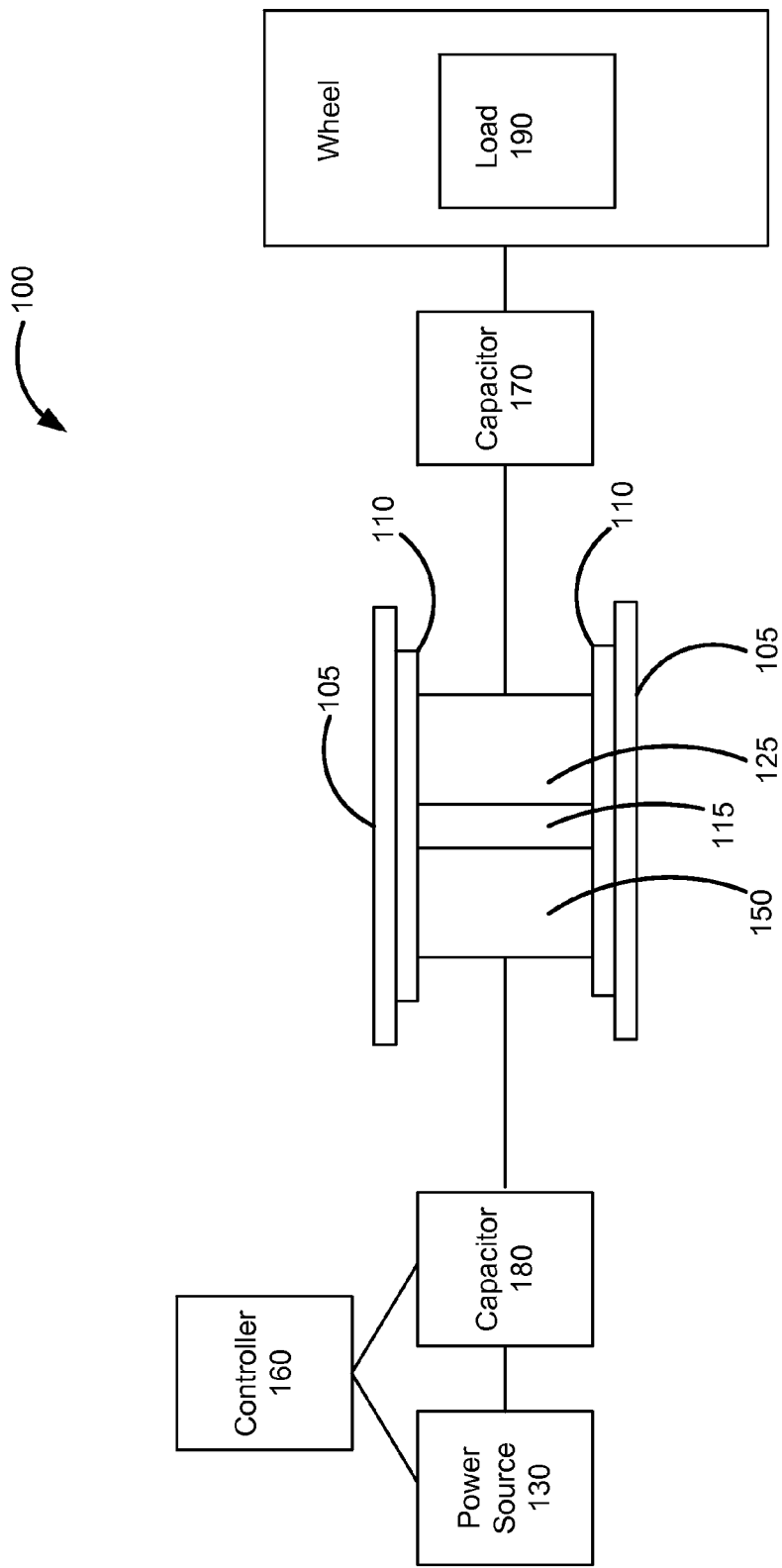
FIG. 1 illustrates, in accordance with various embodiments, a block diagram of a wireless transmission link system.

With reference to FIG. 1 and according to various embodiments, a wireless transmission link system 100 is described herein. Wireless transmission link system 100 is shown, used within the axle 105 of an aircraft tire pressure monitoring system (TPMS). A design constraint of such systems is the amount of electrical energy lost in the form of flux flowing through the metal of the axle 105. For example, the axle 105 may act as a low resistance path for the electrical energy transmitted and the wireless transmission link may short. Electrical energy is the electrical energy carried by moving electrons in an electric conductor. In response, the electrical energy transmitted may be increased such that the minimum amount of electrical energy crossing the air gap 115 can be realized. Historically, a typical solution for this challenge is to input additional electrical energy into the system, which may lead to wasted electrical energy and does not address the problem of how much electrical energy, is lost through available low resistance paths. Moreover, the separation between the two cores comprises two air-gaps. A first inner air gap between the center posts of each core and a second outer air-gap between the two outer walls of each core. The first air gap and the second air gap may be in series in a magnetic circuit. According to various embodiments and with continued reference to FIG. 1, a first cup 125 and/or a second cup 150 comprising ferromagnetic material properties, may be incorporated into a wireless transmission link system 100 to increase the transmission efficiency of the wireless transmission link system 100. The first cup 125 and the second cup 150 may be a matched pair of cups. The matched pair of cups (e.g., a first cup 125 and a second cup 150) may be elements of an inductive power and data delivery wireless transmission link system 100. The first cup 125 and the second cup 150 may be positioned in between an axle 105 and wound coils 210, 215 (with brief reference to FIG. 2) used for electromagnetic energy transmission and act as a near field high permeability path for electromagnetic energy to travel through before the electromagnetic energy is given a chance to be lost in a low resistance path, such as the axle 105. The coupling of the wound coils 210, 215 within the first cup 125 and the second cup 150 determines the transmission efficiency of the wireless transmission link system 100. As the transmission efficiency of the wireless transmission link system 100 is increased, the wireless transmission link system 100 input power from a power source 130 may be decreased. The telemetry unit 110 may further be configured such that electrical connectors coupled to the wound coils (e.g., the wound coils 210 of the first cup 125 and/or the wound coils 215 of the second cup 150) may pass through the telemetry unit 110 to a connector. Using resonance can help improve efficiency of the wireless transmission link system 100 dramatically. Via a resonant coupling, the wound coils 210 of the first cup 125 may be coupled to a capacitor 170. Similarly, the wound coils 215 of the second cup 150 may be coupled to a capacitor 180. The capacitive loaded wireless transmission link system 100 may form a tuned inductor/capacitor (LC) circuit. In response to the wound coils 210 of the first cup 125 and the wound coils 215 of the second cup 150 resonating at a common frequency, significant power may be transmitted between the wound coils 210, 215 over an air gap 115. The wound coils 210 of the first cup 125 may be directly or indirectly electrically coupled to a load 190, such as a sensor (e.g., a tire pressure sensor and/or a wheel mounted sensor). A controller 160, such as a brake control unit or tire pressure control unit, may command and process the signals of the wireless transmission link system 100. A transmitting coil, (e.g., first wound coil) may be substantially surrounded by and/or receded into the axle. According to various embodiments, the second wound coil 215 may be external to the axle. The first cup 125 and the second cup 150 are likely not adhered to object 110. In this way, the first cup 125 and the second cup 150 are configured to rotate with respect to one another. Though telemetry unit 110 may be made from a diverse selection of materials, telemetry unit 110 is generally made of a non-conductive material. The first cup 125 and the second cup 150, (e.g. cores) are generally made of magnetic material. The first cup 125 and the second cup 150 may be separated horizontally by approximately 0.25 inches. In operation there is magnetic flux linking the first cup 125 and the second cup 150. The magnetic flux passes through both magnetic cores and also through the air between the two cores. Where the flux passes through the magnetic cores, the vast majority of that flux is confined inside the cores and very little flux cuts through the materials adjacent to the cores. Where the flux passes between the two cores the flux exhibits a phenomenon called "fringing". Efforts should be taken to isolate the path adjacent to the air gap between the first cup 125 and the second cup 150 from conductive materials.

Coupling a magnetic field from one coil to another coil over an air gap involves a magnetic field of greater intensity than it would if the two coils were linked by some magnetic material such as an iron core. To produce an intense magnetic field around a coil an intense electric current must flow through that coil. Large currents are not consistently readily available in all applications to drive the primary coil. The primary coil and secondary may each be placed in parallel with a capacitor forming two parallel resonant circuits, also referred to as tank circuits. The primary tank circuit is driven at its natural resonant frequency, around 200 kHz. Energy accumulates in this primary tank circuit. The tank circuit consists of a coil in parallel with a capacitor. The energy stored in the tank circuit is alternately exchanged back and forth between the coil and the capacitor. The current that flows between coil and the capacitor may be referred to as a circulation current. As the energy in the primary tank increases the circulation current increases. The circulation current can be tens to hundreds of times greater than the current supplying the tank circuit. In this way, an intense current can be produced in the primary tank circuit which in turn produces an intense magnetic field in the primary coil that is capable of effectively coupling to the secondary coil. Configuring the secondary coil to be part of a parallel resonant circuit or tank circuit tuned to the same resonant frequency and/or the primary tank allows the secondary circuit to except the energy coupled to it easily.

Figure 2:
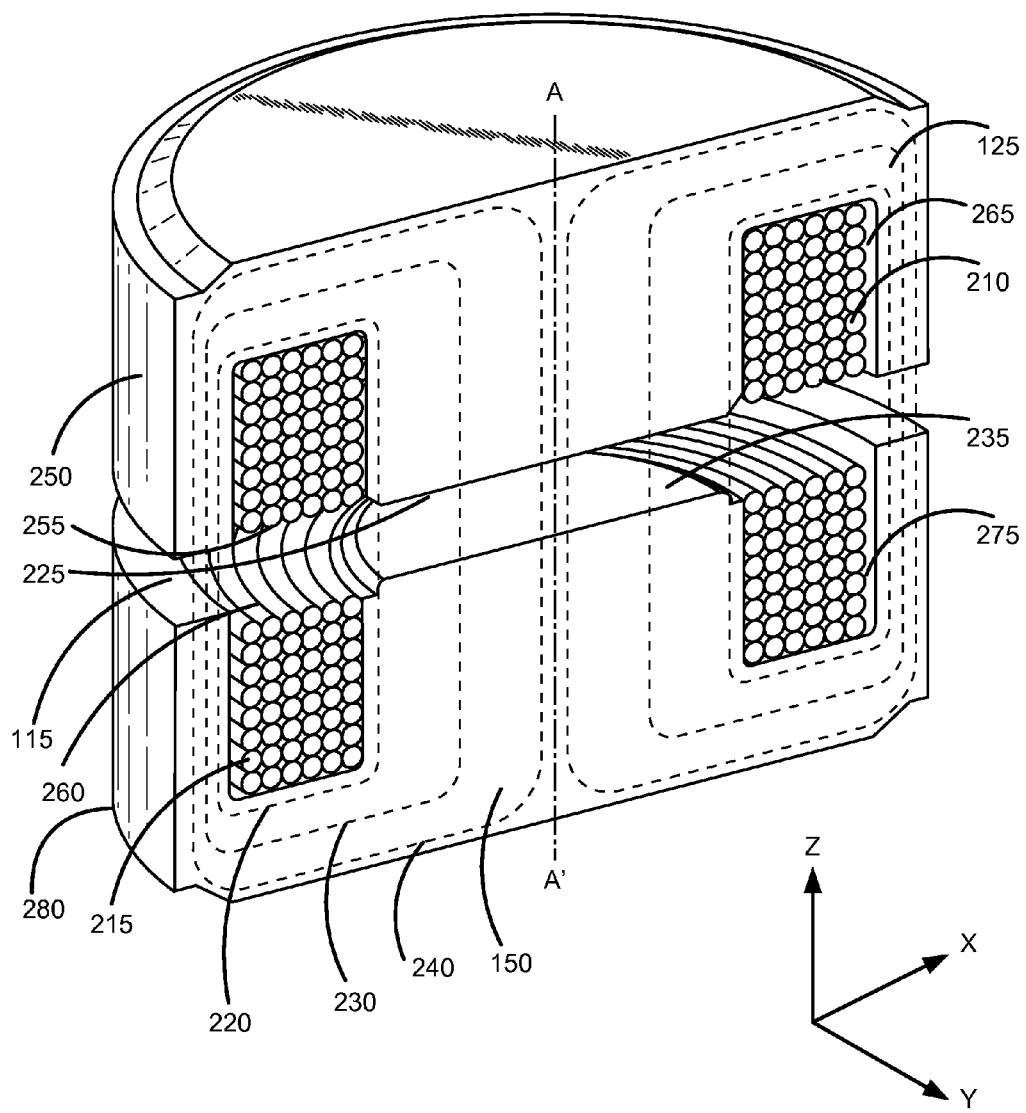
FIG. 2 illustrates, in accordance with various embodiments, an isometric cutaway view of a matched pair of cups of a wireless transmission link system.
Figure 3:
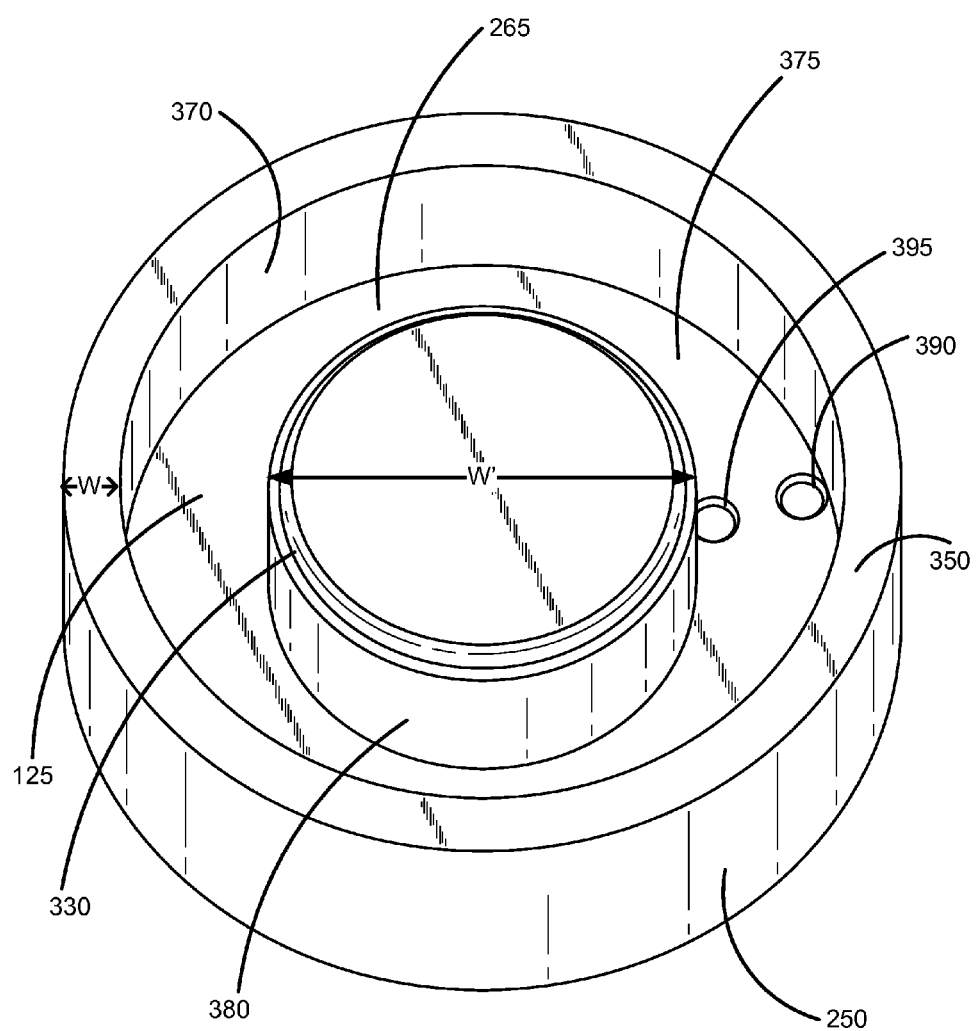
FIG. 3 illustrates, in accordance with various embodiments, an isometric view of a cup of a wireless transmission link system.

According to various embodiments and with reference to FIGS. 2 and 3, the first cup 125 and the second cup 150 are configured to increase the transmission efficiency and to redirect the majority of the magnetic flux from the surrounding metal by providing a path with greater permeability. For instance, at least one of the first cup 125 or the second cup 150 may be configured to redirect magnetic flux in an alternative path of low reluctance. In electrical circuits there is a relationship between Electromotive Force (Voltage), Current, and Resistance. This may be referred to as Ohms law for electric circuits. In magnetic circuits there is a similar relationship between Magneto Motive Force, Magnetic Flux, and Reluctance. This may be referred to as Ohms law for magnetic circuits. Just as electric current follows the path of least resistance, magnetic flux follows the path of least reluctance. Materials of high permeability have low reluctance. One can say that the first cup 125 and the second cup 150 are configured to divert the magnetic flux away from the surrounding metal by providing an alternative path of much lower reluctance.

In this way, the wireless transmission link system 100 may be transformed from a loosely coupled pair of inductors to a substantially excellent coupled rotary transformer. Notably, a rotary transformer is a specialized transformer used to couple electrical signals between two parts that rotate in relation to each other. Rotary transformers are constructed by winding the primary winding and secondary winding into separate halves of a core; these concentric halves face each other, with at least one half mounted to one of the rotating parts. Magnetic flux provides the coupling from one half of the core to the other across an air gap, providing the mutual inductance that couples electrical energy from the transformer's primary winding to its secondary winding. Similarly, in various embodiments of the present wireless transmission link system 100, the wound coils 210 of first cup 125 may be operationally analogous to the windings of a primary winding in a rotary transformer. The wound coils 215 of second cup 150 may be operationally analogous to the windings of a secondary in a rotary transformer. Flux paths 220, 230 and 240 demonstrate a preferred flux path through the ferromagnetic first cup 125 and second cup 150, as opposed to a path through a surrounding axle 105 and/or telemetry unit 110. In this way, wireless transmission link system 100 may comprise a substantially excellent coupled rotary transformer within the axle 105 of a wheeled vehicle (an ideally coupled or unitary coupling is not achievable). Stated another way, wireless transmission link system 100 may comprise a substantially excellent coupled rotary transformer interior to the axle 105 of an aircraft wheel configured to power to and transmit signals from rotating elements of the aircraft wheel.

According to various embodiments, first cup 125 may comprise any desired geometric shape. For instance, and with renewed reference to FIGS. 2 and 3, first cup 125 may comprise a cylindrical shape. All or a portion of first cup 125 may comprise ferromagnetic properties. For instance, first cup 125 may comprise a ferromagnetic material, such as a ferrite or powdered iron. First cup 125 may comprise a cylindrical solid post 330 and an outer ring 350. Cylindrical solid post 330 and outer ring 350 may be concentric. The gap between cylindrical solid post 330 and outer ring 350 may form a channel 265 defined by a circumferential exterior surface 380 of cylindrical solid post 330, a bottom surface 375 normal to the circumferential exterior surface 380, and a circumferential interior surface 370 of outer ring 350. The width W of outer ring 350, may be determined to maximize the flux path within outer ring 350. Similarly, the diameter W' of cylindrical solid post 330 may be determined to maximize the flux path within cylindrical solid post 330 and/or physical limitations within the axle. In this way, the location of wound coils 210 and/or channel 265 may be at any location between centerline A-A' and the exterior circumferential surface 250 of first cup 125.

The dimensions of channel 265 may be any desired dimensions. Wound coils 210 may be stacked and tightly wound within channel 265. The dimensions of channel 265 may be determined to minimize the amount of space between outward facing surfaces of a wound coil 210 and surfaces of the channel 265. Through holes 390 and 395 may be configured to escape wound coil 210 through the face of bottom surface 375. Stated another way, at least a portion of wound coil 210 may travel inside through holes 390 and 395. The channel 265 surfaces may be coated with a ferromagnetic material, such as a ferrite, powdered iron and/or powdered iron coating.

According to various embodiments, second cup 150 may comprise any desired geometric shape. For instance, second cup 150 may mirror the shape of first cup 125. Second cup 150 may comprise a cylindrical cross-sectional shape. All or a portion of second cup 150 may comprise ferromagnetic properties. For instance, second cup 150 may comprise a ferromagnetic material, such as a ferrite and/or powdered iron. Second cup 150 may comprise a channel 275 configured to house wound coils 215. Wound coils 215 may be stacked and tightly wound within channel 275.

Wound coils 210, 215 may be secured in position within channels 265, 275 respectively, using a coating, such as a coating of an epoxy. Wound coils 210, 215 may be configured to transfer power and data. For instance, data may be transmitted to and from a load 190, such as a sensor, to a controller 160. For instance, according to various embodiments, a controller 160, such as a brake control unit, may interpret and measuring changes in current as data being transmitted from the sensor. A short of the wireless transmission link system 100 may communicate a sensor reading. For instance, a primary coil short, and shorts on the sensor may each communicate different information and/or diagnoses. In this way, an unintended short, as was commonplace in conventional systems, presenting a false reading for the controller may be reduced.

Axis A-A' may be the axis of rotation of the axle 105. The axle (not depicted in FIGS. 2 and 3), may substantially surround the exterior circumference of the first cup 125 and the second cup 150. For instance, an exterior circumferential surface 250 of first cup 125 may be coupled to an internal circumferential surface of telemetry unit 110. Similarly, an exterior circumferential surface 280 of the second cup 150 may be coupled to an internal circumferential surface of telemetry unit 110. An exterior circumferential surface of the telemetry unit 110 may be coupled to an internal circumferential surface of axle 105. The first air-gap 115 may be defined by the distance of separation between the two inner posts of the first cup 125 and the second cup 150. A second air-gap is the distance of separation between the surfaces of the two outer walls of the first cup 125 and the second cup 150. The height of the surface 225 in the Z direction of cylindrical solid post 330 of first cup 125 may extend toward the adjacent opposite second cup 150 higher than the outward surface 255 of wound coils 210. Similarly, the height of the surface 235 in the Z direction of cylindrical solid post (not labeled) of the second cup 150 may extend toward the adjacent opposite first cup 125 higher than the outward surface 260 of wound coils 215. This may help to direct flux from wound coils 210 to wound coils 215. As depicted the flux paths, 220, 230, 240 may be redirected by the first cup 125 and the second cup 150. According to various embodiments, first cup 125 and/or load 190 is internal to a wheel configured to rotate. Wound coils 210 and wound coils 215 may be aligned in the Z direction. First cup 125 and second cup 150 may share a common center line, such as axis A-A'. The openings of channel 265 and channel 275 may be oriented along parallel planes.

In response to alternating current being applied to wound coils 210 in series or parallel connection, the wound coils 210 may generate an alternating magnetic flux which moves through the first cup 125 along the flux paths 220, 230, and 240 as depicted in FIG. 2. The complete magnetic path for each pair of wound coils 210, 215 includes two air gaps 115. The magnetic lines of force around wound coils 215 generate voltage in these windings and alternating current power is then available for use by components secured to axle 105 and which may rotate with axle 105.

First cup 125 and second cup 150 reduces the power to be inputted into the wireless transmission link system 100. Additionally, in response to the wound coils 210, 215 being in a highly efficient coupling a resonance frequency may become redundant. As power transmitted is decreased, the heat load of the wireless transmission link system 100, such as the heat load in the brake control unit, may be reduced.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A wireless power transmission link system comprising:
   a stationary axle;
   a telemetry unit interior to the stationary axle;
   a first cup located interior to the telemetry unit, wherein the first cup comprises a first channel for housing a first wound coil;
   a sensor electrically coupled to the first coil and configured to generate a signal; and
   a second cup separated by an air gap from the first cup and configured to rotate relative to the first cup, wherein the second cup comprises a second channel for housing a second wound coil, wherein the first wound coil and the second wound coil are inductively coupled to transmit the signal across the air gap from the first coil to the second coil, wherein at least one of the first cup or the second cup comprise a ferromagnetic material.

2. The wireless power transmission link system according to claim 1, further comprising an inductively coupled, resonant, air-core transformer.

3. The wireless power transmission link system according to claim 1, wherein the first wound coil and the second wound coil communicate to form a rotary transformer.

4. The wireless power transmission link system according to claim 3, wherein the rotary transformer is internal to the stationary axle, wherein the stationary axle is coupled to a wheeled vehicle.

5. The wireless power transmission link system according to claim 1, wherein at least one of the first cup or the second cup comprise at least one of a ferrite or powdered iron.

6. The wireless power transmission link system according to claim 1, further comprising a capacitor electrically coupled to at least one of the second wound coil or the first wound coil.

7. The wireless power transmission link system according to claim 1, wherein the wireless power transmission link system is implemented in at least one of a pressure monitoring system or a wheel mounted sensor.

8. The wireless power transmission link system according to claim 1, wherein data transmitted by the wireless power transmission link system is communicated by a low resistance path transmitted over the air gap, wherein the data communicates a sensor reading.

9. The wireless power transmission link system according to claim 1, further comprising a controller electrically coupled to at least one the first wound coil or the second wound coil.

10. The wireless power transmission link system according to claim 1, wherein a east one of the first cup or the second cup redirect magnetic flux in an alternative path of low reluctance.

11. The wireless power transmission link system according to claim 1, wherein at least one of the first cup or the second cup are cylindrically shaped.

12. The wireless power transmission link system according to claim 1, wherein at least one of the first cup or the second cup comprise through holes configured such that a portion of at least one of the first wound coil or the second wound coil travel inside the through holes.

* * * * *